United States Patent
Reams

(10) Patent No.: US 9,257,034 B2
(45) Date of Patent: Feb. 9, 2016

(54) SYSTEMS, METHODS AND APPARATUS FOR PROVIDING AN AUDIO INDICATOR VIA A REMOTE CONTROL

(75) Inventor: William R. Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 861 days.

(21) Appl. No.: 12/389,272

(22) Filed: Feb. 19, 2009

(65) Prior Publication Data

US 2010/0208146 A1     Aug. 19, 2010

(51) Int. Cl.
| | |
|---|---|
| H04N 5/44 | (2011.01) |
| G08C 17/02 | (2006.01) |
| G08C 23/04 | (2006.01) |
| H04N 21/422 | (2011.01) |
| H04N 5/60 | (2006.01) |

(52) U.S. Cl.
CPC ............... *G08C 17/02* (2013.01); *G08C 23/04* (2013.01); *H04N 5/4403* (2013.01); *H04N 21/42207* (2013.01); *H04N 21/42222* (2013.01); *G08C 2201/50* (2013.01); *H04N 5/602* (2013.01)

(58) Field of Classification Search
CPC ............ H04N 5/4403; H04N 5/44582; H04N 5/23241; H04N 5/232
USPC .............. 348/734; 340/12.22, 4.37, 8.1, 7.57, 340/7.58, 426.13, 5.61, 5.64, 815.6
See application file for complete search history.

(56) References Cited

U.S. PATENT DOCUMENTS

| | | |
|---|---|---|
| 4,067,000 A | 1/1978 | Carlson |
| 4,231,026 A | 10/1980 | Sullivan |
| 4,578,671 A | 3/1986 | Flowers |
| 5,115,236 A | 5/1992 | Kohler |
| 5,164,652 A | 11/1992 | Johnson |
| 5,204,657 A | 4/1993 | Prosser |
| 5,294,915 A | 3/1994 | Owen |
| 5,455,560 A | 10/1995 | Owen |
| 5,506,572 A | 4/1996 | Hills |

(Continued)

FOREIGN PATENT DOCUMENTS

| | | |
|---|---|---|
| EP | 1701539 A2 | 9/2006 |
| GB | 2331610 | 5/1999 |

(Continued)

OTHER PUBLICATIONS

Osoinach, Bryce, "Proximity Capacitive Sensor Technology for Touch Sensing Applications", Proximity Sensing White Paper prepared for Freescale Semiconductor, Inc., Tempe, Arizona, 2007, 12 Pages.

(Continued)

*Primary Examiner* — Jefferey Harold
*Assistant Examiner* — Omer Khalid
(74) *Attorney, Agent, or Firm* — Ingrassia Fisher & Lorenz, P.C.

(57) ABSTRACT

Apparatus, systems and methods are described for outputting audible or visual indicators via a remote control for a controlled device. A remote control queries an associated controlled device for information. The controlled device generates a request for the remote control to activate an audio or visual indicator. The request is integrated with a response to the query that is transmitted to the remote control. The remote control outputs an audio or visual indicator responsive to the request.

20 Claims, 4 Drawing Sheets

(56) References Cited

U.S. PATENT DOCUMENTS

| | | | |
|---|---|---|---|
| 5,598,143 | A | 1/1997 | Wentz |
| 5,638,050 | A | 6/1997 | Sacca |
| 5,926,090 | A | 7/1999 | Taylor |
| 5,945,918 | A | 8/1999 | McGonigal |
| 5,963,010 | A | 10/1999 | Hayashi |
| 5,990,868 | A | 11/1999 | Frederick |
| 5,999,799 | A | 12/1999 | Hu |
| 6,191,551 | B1 | 2/2001 | Fischer |
| 6,373,256 | B1 | 4/2002 | Hanjani |
| 6,535,125 | B2 * | 3/2003 | Trivett ............... 340/539.13 |
| 6,573,832 | B1 | 6/2003 | Fugere-Ramirez |
| 6,938,101 | B2 | 8/2005 | Hayes |
| 6,985,069 | B2 | 1/2006 | Marmaropoulos |
| 7,009,528 | B2 | 3/2006 | Griep |
| 7,109,848 | B2 | 9/2006 | Schybergson |
| 7,140,033 | B1 | 11/2006 | Durden |
| 8,082,455 | B2 | 12/2011 | Reams |
| 8,134,475 | B2 | 3/2012 | R. |
| 8,339,246 | B2 * | 12/2012 | Langer ............ G08B 21/24 340/12.22 |
| 2003/0035074 | A1 | 2/2003 | Dubil et al. |
| 2003/0140343 | A1 | 7/2003 | Palvo |
| 2003/0149978 | A1 | 8/2003 | Plotnick |
| 2003/0159146 | A1 | 8/2003 | Kim |
| 2004/0051638 | A1 * | 3/2004 | Green ................. 340/539.32 |
| 2004/0148632 | A1 | 7/2004 | Park et al. |
| 2004/0168187 | A1 * | 8/2004 | Chang ..................... 725/40 |
| 2004/0203554 | A1 * | 10/2004 | Simon ..................... 455/345 |
| 2005/0204388 | A1 | 9/2005 | Knudson |
| 2006/0034611 | A1 | 2/2006 | Li |
| 2007/0018845 | A1 | 1/2007 | Sutardja |
| 2007/0162939 | A1 | 7/2007 | Bennett |
| 2008/0088748 | A1 | 4/2008 | Lim |
| 2008/0163049 | A1 | 7/2008 | Krampf |
| 2008/0278635 | A1 | 11/2008 | Hardacker et al. |
| 2009/0070840 | A1 | 3/2009 | Kamimaki |
| 2009/0094645 | A1 * | 4/2009 | Ting .................. G08C 17/00 725/39 |
| 2009/0122206 | A1 * | 5/2009 | Jung ................ H04N 5/4403 348/734 |
| 2009/0243909 | A1 * | 10/2009 | Reams ............... G06F 1/3203 341/173 |
| 2009/0303097 | A1 * | 12/2009 | Reams ............... H03J 1/0025 341/176 |
| 2010/0013551 | A1 | 1/2010 | Reams |
| 2010/0154006 | A1 | 6/2010 | Reams |
| 2010/0208146 | A1 | 8/2010 | Reams |
| 2011/0156862 | A1 | 6/2011 | Langer |
| 2013/0099905 | A1 | 4/2013 | Langer |

FOREIGN PATENT DOCUMENTS

| | | | |
|---|---|---|---|
| JP | 11355153 A | * | 12/1999 |
| JP | 130848 | | 5/2000 |

OTHER PUBLICATIONS

Reams, William R., "Systems and Methods for Controlling the Power State of Remote Control Electronics", U.S. Appl. No. 12/056,520, filed Mar. 27, 2008.

Reams, William R., "Reduction of Power Consumption in Remote Control Electronics", U.S. Appl. No. 12/056,819, filed Mar. 27, 2008.

Reams, William R., "Systems and Methods for a Remote Alarm", U.S. Appl. No. 12/336,268, filed Dec. 16, 2008.

Reams, William, "Systems and Methods for Controlling Power Consumption in Electronic Devices", U.S. Appl. No. 12/175,897, filed Jul. 18, 2008.

Reams, William, "Systems, Methoda and Apparatus for Changing an Operational Mode of a Remote Control", U.S. Appl. No. 12/135,370, filed Jun. 9, 2008.

Reams, William, "Backlighting Remote Controls", U.S. Appl. No. 12/404,848, filed Mar. 16, 2009.

International Search Report for PCT/US2009/066880 mailed on Feb. 11, 2010.

Office Action mailed on Jul. 8, 2011 for U.S. Appl. No. 12/336,268 in the name of William Reams.

U.S. Appl. No. 12/649,628, filed Dec. 30, 2009 in the name of William Reams.

USPTO, Final Office Action, mailed Dec. 30, 2011 for U.S. Appl. No. 12/336,268.

USPTO, Non-Final Office Action, mailed Apr. 26, 2013 for U.S. Appl. No. 13/715,949.

USPTO, Final Office Action, mailed Jul. 26, 2013 for U.S. Appl. No. 13/715,949.

U.S. Patent and Trademark Office, Non-Final Office Action, dated May 6, 2014 for U.S. Appl. No. 12/336,268.

* cited by examiner

SYSTEMS, METHODS AND APPARATUS FOR PROVIDING AN AUDIO INDICATOR VIA A REMOTE CONTROL

BACKGROUND

The creation of the wireless television remote control simplified the television viewing experience for most people, as viewers could remotely operate a television from the couch or other location away from the television. Unfortunately, the wireless television remote control created a new problem plaguing mankind—the lost remote control. Remote controls are easily misplaced, easily hidden under furniture and other objects and can be carried into many locations within a home, making it difficult to locate a lost remote control. Thus, the viewer may spend a significant amount of time trying to locate a lost remote control rather than watching television, leading to a less than desirable viewing experience.

BRIEF DESCRIPTION OF THE DRAWINGS

The same number represents the same element or same type of element in all drawings.

DETAILED DESCRIPTION

Figure 1:
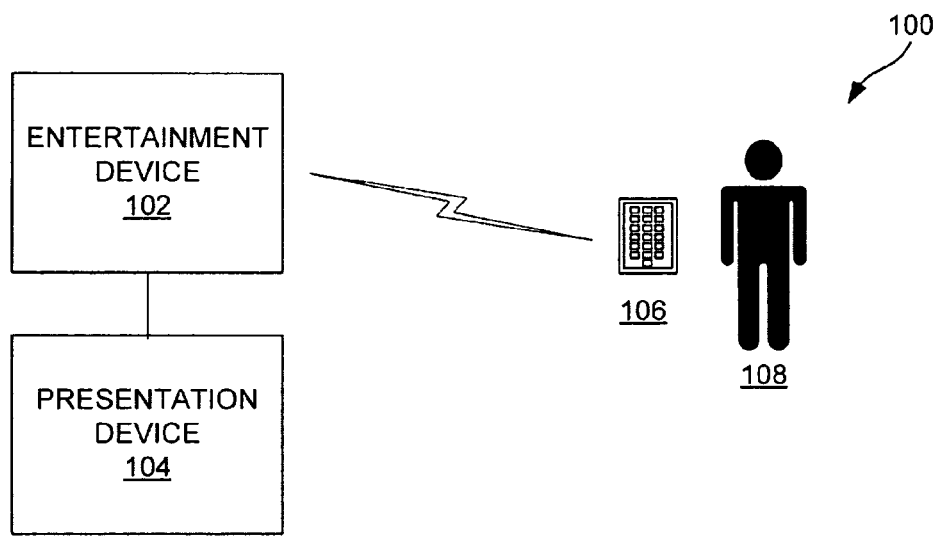
FIG. 1 illustrates an embodiment of an entertainment system.

The various embodiments described herein generally provide apparatus, systems and methods for providing audible or visual indicators via a remote control for a controlled device. More particularly, the various embodiments described herein generally provide a remote control that queries an associated controlled device for information. Based on a response to the query, the remote control may output audio or visual indicators via integrated presentation devices.

In at least one embodiment, the remote control includes a sound emitting device, such a speaker or buzzer. The remote control transmits a query to the controlled device and receives a response to the query, the response requesting activation of the sound emitting device. Responsive to the request from the controlled device, the remote control activates the sound emitting device to output audible information. In at least one embodiment, the sound emitting device is activated for a specified period of time, e.g., one minute. In some embodiments, the sound emitting device may be deactivated by the remote control based upon additional commands received from the controlled device.

The sound emitting device may also be deactivated based upon input provided to the remote control by a user. For example, the remote control may activate the sound emitting device upon command from the controlled device. A user may subsequently press one or more buttons of the remote control while the sound emitting device is activated. Responsive to the input, the remote control may deactivate the sound emitting device.

In at least one embodiment, the remote control may include a visual indicator, such as light emitting diodes (LEDs), a flashing strobe light, a display screen (e.g., liquid crystal diode (LCD) screen). The remote control receives a response to a query from the controlled device, the response requesting activation of the visual indicator. Responsive to the request from the controlled device, the remote control activates the visual indicator to present information to a user. For example, the remote control may blink one or more LEDs responsive to a request from the controlled device.

In some embodiments, the remote control may include both sound emitting devices and light emitting devices, such as a speaker and one or more LEDs. Thus, the remote control may output information via both the visual and audio indicator devices responsive to a request from the controlled device. The request may include information specifying the type of audio and visual data to be outputted by the remote control.

The query to the controlled device may be performed according to a pre-determined schedule or may be performed responsive to particular actions or events. In at least one embodiment, a remote control periodically queries a controlled device according to a pre-determined schedule to download various types of information from the controlled device. For example, the remote control may query the controlled device for status updates as part of a power saving feature. As appropriate, the controlled device may request the remote control to activate the audio or visual indicators in response to a query.

For example, a user may desire to locate a lost remote control. The user may provide input to the controlled device requesting to locate the remote control. The controlled device generates a request to activate the sound emitting device of the remote control. Responsive to a subsequently received query from the remote control, the controlled device may transmit the request to the remote control. Responsive to the request, the remote control provides an indicator via the sound emitting device or other device. The user may then utilize the indicator to locate the lost remote control.

A controlled device may also request to activate an indicator of the remote control responsive to timers associated with the controlled device. For example, a controlled device may activate a speaker of a remote control to provide an alarm clock function to a user. Thus, the alarm clock function may be utilized to remind a user of events that are independent of the controlled device. In another example, the alarm clock function may be utilized to remind a user regarding events associated with the controlled device. For example, a television receiver may include an alarm function that alerts the user regarding a selected television program or other content available through the television receiver. The sound emitting device of the remote control may be utilized to provide an indicator to the user regarding the alarm function.

In at least one embodiment, the indicator of the remote control may be utilized to provide the user with information regarding events or actions associated with the controlled device. For example, a television receiver may include functionality allowing users to exchange messages or other communications. If the television receiver receives a message for a user, then the television receiver can request the remote control to provide indication of the message to the user. For example, the remote control may output a specified sound responsive to receipt of the message by the television receiver or responsive to receipt of a phone call to the user's telephone.

In at least one embodiment, different sounds may be associated with different users of the controlled device, different actions, events or functionalities of the controlled device. Thus, the controlled device may specify different sounds, frequencies or tones in the request to the remote control. For example, different users may set different reminders on a television receiver for different television programming. A reminder for a first user may be associated with a first tone, whereas a reminder for a second user may be associated with a second tone. Thus, different users may be able to identify their indicators outputted from the remote control as differentiated from indicators for other users of the controlled device.

The controlled device is described herein as an entertainment device. However, it is to be appreciated that the teachings described herein may be applied to other combinations of remote controls and controlled devices. For example, the teachings described herein may be applied to household appliances, computers and wireless peripherals (e.g., keyboards, mice and pointing devices), automobile keyless entry systems, child locator systems and the like.

FIG. 1 illustrates an embodiment of an entertainment system 100. The entertainment system 100 presents content to a user 108. In at least one embodiment, the content presented to the user 108 includes an audio/video stream, such as a television program, movie or other stored or recorded content and the like. The entertainment system 100 includes an entertainment device 102, a presentation device 104 and a remote control 106. Each of these components is discussed in greater detail below. The entertainment system 100 may include other devices, components or elements not illustrated for the sake of brevity.

The entertainment device 102 is operable to receive content from one or more content sources (not shown in FIG. 1), and to present the received content to the user 108 on the associated presentation device 104. In at least one embodiment, the presentation device 104 is a display device (e.g., a television) configured to display content to the user 108. The entertainment device 102 may receive an audio/video stream in any format (e.g., analog or digital format), and output the audio/video stream for presentation by the presentation device 104. The entertainment device 102 may be further configured to display menus and other information that allow a user 108 to control the output of content by the entertainment device 102. In at least one embodiment, the entertainment device 102 is a set-top box (e.g., a satellite or cable television converter box), digital video recorder (DVR) or other similar device that processes and provides one or more audio and/or video output streams to the presentation device 104 for presentation to the user 108. In some embodiments, the entertainment device 102 and the presentation device 104 may be integrated as a device combining the functionality of a display device and a set-top box, digital video recorder (DVR) or the like.

The entertainment device 102 has multiple operating states, corresponding with different available functionalities. For example, a first operating state may correspond with a powered-on state, whereas a second operating state may correspond with a powered-off state. In some embodiments, a first operating state is associated with the entertainment device 102 outputting a menu navigable with the remote control 106.

The remote control 106 may be any system or apparatus configured to remotely control the output of content by the entertainment device 102. For example, the remote control 106 may communicate commands to the entertainment device 102 requesting to playback content, temporally move through content (e.g., fast-forward or reverse), adjust the volume, access electronic programming guides, menus and the like. In some embodiments, the remote control 106 may additionally be configured to remotely control the presentation device 104. The remote control 106 may communicate with the entertainment device 102 and/or the presentation device 104 through any type of wireless communication medium, such as infrared (IR) signals or radio-frequency (RF) signals.

The remote control 106 is further operable to query the entertainment device 102 for information and other data. For example, the remote control 106 may query the entertainment device 102 for operating status information, firmware updates, control command sets and other requests. In at least one embodiment, the queries transmitted by the remote control 106 may request general information from the entertainment device 102. For example, the remote control 106 may request any information to be transmitted from the entertainment device 102, e.g., status requests, commands, software/firmware updates and the like. Thus, the entertainment device 102 may initiate transmission of any data ready to be transmitted to the remote control 106. For example, the entertainment device 102 may transmit a status update, a firmware update and request to activate an indicator of the remote control responsive to a particular query.

In some embodiments, the remote control 106 may request specific information, such as an operating status of the entertainment device 102. Thus, the entertainment device 102 may transmit the requested information and may queue other data to be transmitted until a later time.

Responsive to a query, the entertainment device 102 may transmit requests to the remote control 106 to undertake specific actions. For example, the entertainment device 102 may request the remote control 106 to activate a sound emitting device, vibration inducing device, light emitting device or other visual indicator. In response to some queries, the entertainment device 102 may request the remote control 106 to deactivate the sound emitting device or other indicator.

In at least one embodiment, a query may be transmitted responsive to a specified event. For example, a query may be transmitted a specified period of time after the last receipt of input by the remote control 106. In another example, the remote control 106 may transmit a query responsive to receipt of a particular type of input, e.g., a particular button press. In another example, the remote control 106 may transmit a query to the entertainment device 102 regarding whether to deactivate a sound emitting device responsive to a request by the entertainment device 102 to activate the same.

In at least one embodiment, the queries may be conducted according to a pre-determined schedule. For example, the remote control 106 may query the entertainment device 102 every two seconds requesting any status changes or other data to be exchanged. Thus, the remote control 106 may determine whether to enter a low power mode state based upon the query response.

For example, the remote control 106 may be configured to periodically enter a limited power mode state (e.g., a sleep mode state or stand-by mode state) to conserve battery power. More particularly, components of the remote control 106, such as processors, user input circuitry, transceivers, backlighting, display screens and the like may be commanded to enter a limited power mode state when the functionality of the components is not needed by the entertainment system 100. For example, the remote control 106 may enter a sleep mode state when the entertainment device 102 is powered off. Particular components of the remote control may also enter a limited power mode state if the entertainment device 102 is in an operational state that does not involve soliciting input from the user 108 via the remote control 106.

In at least one embodiment, the remote control 106 queries the entertainment device 102 to determine whether to enter a limited power mode state while operating in an active mode state. For example, the remote control 106 may operate in an active mode state that includes utilizing a touch pad input device in an active mode state to solicit user input for controlling a menu outputted by the entertainment device 102 for display on the presentation device 104. While the touch pad input device operates in the active mode state, the remote control 106 may periodically query the entertainment device 102 to determine whether the entertainment device 102 is still operating in a state that utilizes the touch pad input device. If the operating state of the entertainment device 102 does not need to utilize the touch pad input device (e.g., the entertainment device 102 is no longer outputting a menu), then the remote control 106 may command the touch pad input device to enter a limited power mode state.

In another embodiment, the remote control 106 may operate in an active mode state, and may query the remote control and receive a response indicating that the entertainment device 102 has been powered off. For example, the user 108 may have powered off the entertainment device 102 using a front console of the entertainment device 102. Thus, the components of the remote control 106 may enter a limited power mode state, periodically waking to query the entertainment device 102 for operational mode changes (e.g., powering on the entertainment device 102). If an operational mode change is detected by the remote control 106, then appropriate components of the remote control 106 may be commanded to enter an active mode state corresponding with the operational state of the entertainment device 102.

Figure 2:
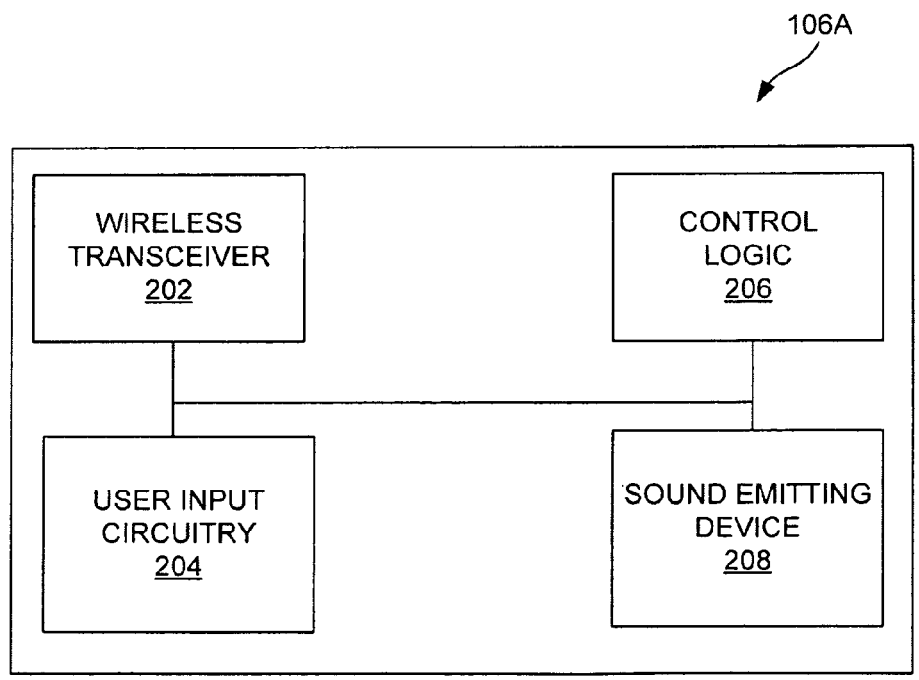
FIG. 2 illustrates an embodiment of a remote control of the entertainment system of FIG. 1.

FIG. 2 illustrates an embodiment of a remote control 106A of the entertainment system 100 of FIG. 1. FIG. 2 will be discussed in reference to the entertainment system 100 illustrated in FIG. 1. The remote control 106A includes a wireless transceiver 202, user input circuitry 204, control logic 206 and a sound emitting device 208. Each of these components is discussed in greater detail below. The remote control 106A may contain other devices, such as display screens, backlighting and non-volatile memory, not mentioned herein for the sake of brevity.

The user input circuitry 204 is operable to receive and/or process user input from the user 108 (see FIG. 1). In at least one embodiment, the user input circuitry 204 is a keypad including a set of buttons. The user 108 may utilize the keypad to input channel numbers, control the volume of the entertainment device 102, navigate menus, manipulate the output of content by the entertainment device 102 and/or control other functions of the entertainment device 102 and/or the presentation device 104.

In at least one embodiment, the user input circuitry 204 comprises a positional information input device configured to solicit positional information from the user 108. The positional information input device receives motion input from the user 108 and translates the motion input into positional information utilized to generate commands for the entertainment device 102. For example, the positional information may be utilized to navigate an onscreen menu outputted by the entertainment device 102. More particularly, the motion input is utilized to position a cursor of the menu, and/or to make selections within the menu. A touch pad is one example of a positional information input device. In some embodiments, motion input may be utilized to change channels of the entertainment device 102. It is to be appreciated that motion input may be utilized to generate commands for a plurality of functions of the entertainment device 102. Exemplary motion detector devices include mechanical switches, gyroscopes and accelerometers. Motion detectors may be utilized that detect motion, vibration or acceleration among any number of axes. For example, a three element accelerometer may be utilized for detecting accelerations along an x, y and z axis.

The wireless transceiver 202 is operable to bi-directionally communicate with the entertainment device 102 and/or the presentation device 104. The wireless transceiver 202 may utilize any type of wireless protocol and wireless communication medium, including RF or IR key codes or commands, to communicate with the entertainment device 102 (see FIG. 1) and/or the presentation device 104.

The wireless transceiver 202 is operable to transmit a key code and/or command message corresponding with user input to the entertainment device 102. The wireless transceiver 202 is also operable to exchange other data with the entertainment device 102, such as operational status queries and responses. For example, the wireless transceiver 202 may transmit queries to the entertainment device 102 responsive to a pre-defined schedule. The remote control 106A may also receive IR database key codes, RF database key codes or firmware updates from the entertainment device 102 responsive to the queries. In one at least one scenario, the wireless transceiver 202 receives data from the entertainment device 102 requesting to activate the sound emitting device 208. Data received from the entertainment device 102 by the wireless transceiver 202 is transferred to the control logic 206 for processing.

The control logic 206 is operable to control the operation of the remote control 106A. The control logic 206 may be a single processing device or a plurality of processing devices that cooperatively operate to control the operation of the remote control 106. The operation of the remote control 106 may be controlled by instructions executable by the control logic 206. Some examples of instructions are software, program code, and firmware.

The control logic 206 is operable to generate control commands for the entertainment device 102 responsive to the input provided to the user input circuitry 204 by the user 108 (see FIG. 1). The control commands may be in the form of key codes or other commands that are compatible with the entertainment device 102. The control commands may also allow for the control of the presentation device 104. The control logic 206 is also operable to process data received from the entertainment device 102. For example, the control logic 206 may process data received from the entertainment device 102 and activate the sound emitting device 208 to output sounds, such as tones, music, speech and the like.

The sound emitting device 208 may comprise a speaker, a buzzer or other type of device operable to emit sounds perceptible to the user 108 (see FIG. 1). The sound emitting device 208 may include appropriate circuitry for outputting different sounds, tones, frequencies and the like. In some embodiments, the sound emitting device 208 may include voice synthesizer circuitry for outputting synthetic speech data.

A request from the entertainment device 102 (see FIG. 1) may specify parameters for activation of the sound emitting device 208. For example, the request may specify the tone, frequency, duration, sound or speech (if appropriate) and the like. In some embodiments, the request may specify the purpose of the indicator and the control logic 206 may process the request to determine parameters for activating the sound emitting device 208.

For example, a request from the entertainment device 102 to activate the sound emitting device 208 may be responsive to input from the user 108 requesting to locate the remote control 106A. The control logic 206 may process the request to determine which tone and frequency to output based on the information in the request. In at least one embodiment, the control logic 206 is operable to activate the sound emitting device 208 for a specified period of time, e.g., one minute. In some embodiments, the user 108 may deactivate the sound emitting device 208 by providing input to either the remote control 106A, via the user input circuitry 204, or via the entertainment device 102.

For example, to deactivate the sound emitting device 208 the user 108 may press one or more buttons of the user input circuitry 204. The control logic 206 then processes the user input and responsively deactivates the sound emitting device 208. If the user 108 provides input via a front panel of the entertainment device 102 or via another remote control for the entertainment device 102, then the entertainment device 102 transmits a request to the remote control 106A to deactivate the sound emitting device 208. The control logic 206 processes the request and deactivates the sound emitting device 208. In at least one embodiment, the request to deactivate the sound emitting device 208 is transmitted to the remote control 106A responsive to a query from the wireless transceiver 202.

In some embodiments, the remote control 106A may activate the sound emitting device 208 responsive to other requests from the entertainment device 102. For example, the sound emitting device 208 may be activated as an alarm clock or reminder set by the user 108 or as a reminder for television programming to be received by the entertainment device 102. In other embodiments, the entertainment device 102 may request activation of the sound emitting device 208 to signal the completion of a task performed by the entertainment device 102, such as completion of a download of content, download or arrival of emails, chat information and the like. The entertainment device 102 may also request the activation of the sound emitting device 208 to signal the success or failure of pairing or depairing of the remote control 106A with the entertainment device 102.

In at least one embodiment, the remote control 106A may include other types of indicators, such as light emitting devices or other display devices. For example, the remote control 106A may include LEDs or other lights which can be flashed to indicate information to the user 108. In one example, the user input circuitry 204 includes buttons with integrated LEDs. Thus, the buttons of the user input circuitry may be flashed to indicate information to the user 108. The visual indicators may be activated by the control logic 206 in association with the sound emitting device 208 or independently, depending on desired design criteria.

Figure 3:
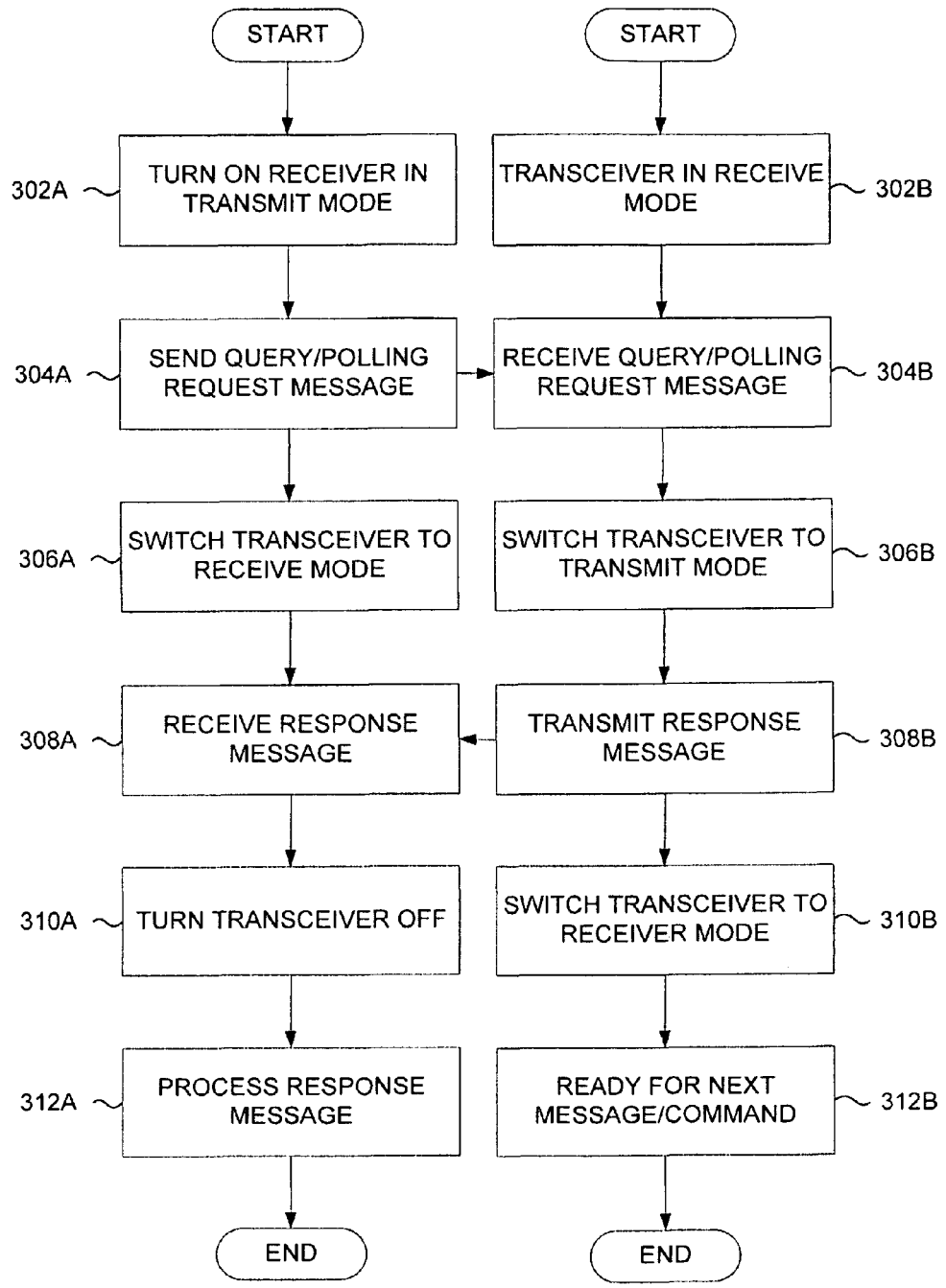
FIG. 3 illustrates an embodiment of a flow chart for a querying process performed by the remote control and the entertainment device of FIG. 2.

FIG. 3 illustrates an embodiment of a flow chart for a querying process performed by the remote control 106A and the entertainment device 102 of FIG. 2. The operation of FIG. 3 will be described in reference to the entertainment system 100 described in FIGS. 1 and 2. The process of FIG. 3 may include other operations not illustrated for the sake of brevity.

As described above, the remote control 106A may periodically query the entertainment device 102 for any type of information, such as status updates and commands from the entertainment device 102, rather than listening for the entertainment device 102 to transmit the information to the remote control 106A. The left side of the flow chart illustrates a process performed by the remote control 106A to query the entertainment device 102. Similarly, the right side of the flow chart illustrates a process performed by the entertainment device 102 to receive and respond to queries from the remote control 106A.

Periodically, the remote control 106A places the wireless transceiver 202 in a transmit mode (operation 302A). At the same time, the entertainment device 102 transceiver operates in a receive mode, ready to receive messages and commands from the wireless transceiver 202 of the remote control 106A (operation 302B).

In operation 304A, the wireless transceiver 202 transmits a query message to the entertainment device 102. After transmitting the query message, the wireless transceiver 202 of the remote control 106A switches to a receive mode, ready to receive a response to the query from the entertainment device (operation 306A). The entertainment device 102 receives the query message (operation 304B) and switches the transceiver of the entertainment device to a transmit mode to respond to the query (operation 306B).

The entertainment device 102 identifies any information to be transmitted to the remote control 106A and transmits a response message to the remote control 106A (operation 308B). For example, the entertainment device 102 may identify firmware updates, power state changes, configuration changes, operational mode changes and requests to activate the sound emitting device 208 of the remote control 106A and transmit such information in the response. In at least one scenario, the entertainment device 102 may transmit a message to the wireless transceiver 202 indicating that there is no information to convey. After transmitting the message, the wireless transceiver of the entertainment device 102 switches to a receive mode (operation 310B), ready to receive another query from the remote control 106A and/or a command from the remote control 106A (operation 312B).

The wireless transceiver 202 of the remote control 106A receives the response message from the remote control 106A and transmits the message to the control logic 206 for further processing (operation 308A). The wireless transceiver 202 then turns off or otherwise enters a low power mode state until the remote control 106A is ready to transmit another query message (operation 310A). The control logic 206 then processes the response message as appropriate (operation 312A). For example, the control logic 206 may command the sound emitting device 208 to emit a sound responsive to the message from the entertainment device 102.

Because the remote control 106A does not operate the wireless transceiver 202 in an active mode at all times, the battery life of the remote control 106A is increased. Operating the wireless transceiver 202 in an active mode at all times is power intensive and significantly shortens the life of the battery powering the remote control 106A. However, as described above, the remote control 106A may bi-directionally communicate with the entertainment device 102 and receive information as appropriate, such as requests to activate the sound emitting device 208, without activating the wireless transceiver 202 to listen for such requests at unnecessary times. Rather, the remote control 106A determines when to access such requests and other data from the entertainment device 102, and activates the wireless transceiver 202 as appropriate to exchange such data, conserving battery power and increasing the battery life for the battery of the remote control 106A.

Those of ordinary skill in the art will appreciate that the various functional elements 302 through 308 shown as operable within the remote control 106A may be combined into fewer discrete elements or may be broken up into a larger number of discrete functional elements as a matter of design choice. Thus, the particular functional decomposition suggested by FIG. 3 is intended merely as exemplary of one possible functional decomposition of elements within the remote control 106A.

Figure 4:
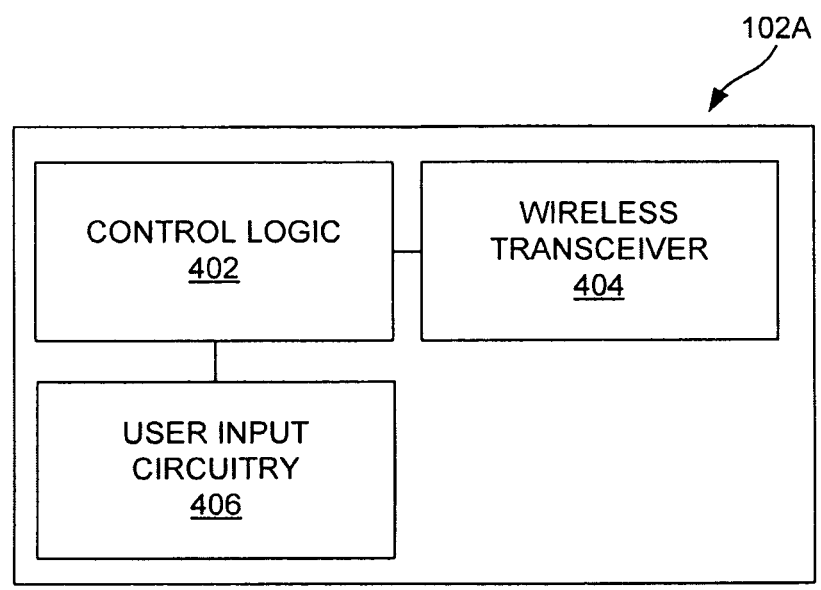
FIG. 4 illustrates an embodiment of an entertainment device of FIG. 1.

FIG. 4 illustrates an embodiment of an entertainment device 102A of FIG. 1. More particularly, FIG. 4 illustrates an entertainment device 102A embodied as a television receiver (e.g., a set-top box). However, it is to be appreciated that the entertainment device 102A may comprise any type of device that presents any type of presentation content, including DVD players, audio receivers, audio playback devices, video servers and internet connected video playback devices. FIG. 4 will be discussed in reference to the entertainment system 100 illustrated in FIG. 1. The entertainment device 102A includes control logic 402, a wireless transceiver 404 and user input circuitry 406. Each of these components will be discussed in greater detail below. The entertainment device 102A may include other components or devices not illustrated for the sake of brevity.

The control logic 402 is operable for controlling the operation of the entertainment device 102A. The control logic 402 may also be referred to herein as an output interface for video content. As used herein, control logic 402 refers to a single processing device or a group of inter-operational processing devices. The operation of the control logic 402 may be controlled by instructions executable by the control logic 402. Some examples of instructions are software, program code, and firmware. Additionally, the operation of particular functionalities of the control logic 402 is controllable based on commands received from a remote control 106 (see FIG. 1). In at least one embodiment, the control logic 402 includes at least a first operating state and a second operating state. The operating states may be of any type as described above.

In at least one embodiment, the control logic 402 is operable for receiving presentation content, e.g., video content. The control logic 402 may be operable for receiving and tuning any type of video content. For example, the control logic 402 may receive an over-the-air broadcast signal, an internet protocol video stream, a direct broadcast satellite signal or a cable television signal. The control logic 402 may receive or retrieve content from a storage medium, such as an optical disk, internal or external hard drive, a portable storage device (e.g., universal serial bus (USB) memory sticks) and the like. The control logic 402 may also receive content from external servers, such as video servers, that are communicatively coupled to the entertainment device 102A over the internet or other type of data networks.

The control logic 402 may operate to perform various signal and data processing functions such as demodulation, decoding, decryption and the like on data signals received via any type of network interface, to generate an appropriate format video stream for output to the presentation device 104 (see FIG. 1). The control logic 402 may comprise multiple components, such as a demodulator, an audio decoder, a video decoder, a data decoder or a graphics processor to generate the video stream. Commands received from the remote control 106 are operable to control the output of audio and video content by the control logic 402. For example, the wireless transceiver 404 may receive a key code causing control logic 402 to manipulate the output of the video content responsive to the key code. The control logic 402 operates to output a video stream for presentation by the presentation device 104. The video stream generated by the control logic 402 may include menus, electronic programming guides and the like that are navigable using commands received from the remote control 106.

The wireless transceiver 404 is operable to wirelessly receive and/or transmit data to the remote control 106. The wireless transceiver 404 may communicate with the remote control 106 utilizing any type of IR or RF communication link. In at least one embodiment, the wireless transceiver 404 receives a key code from the remote control 106, and responsively provides the key code to the control logic 402. The wireless transceiver 404 is further operable to exchange data with the remote control 106, such as IR database code updates, firmware updates and the like.

The wireless transceiver 404 is further operable to exchange operational state queries and operational state responses with the remote control 106. For example, the remote control 106 transmits an operational state query to the wireless transceiver 404. The wireless transceiver 404 receives the operational state response to the query from the control logic 402 and transmits the operational state response to the remote control 106. Thus, the remote control 106 utilizes the operational state response, as described above, to determine whether to transition to or from a limited power mode state.

The wireless transceiver 404 is also operational to transmit other data to the remote control 106. For example, the wireless transceiver 404 may transmit a command, generated by the control logic 402, requesting the remote control 106 to activate an audible or visual indicator, such as a speaker. A request to activate an indicator may be transmitted responsive to a query from the remote control 106. In other words, if the control logic 402 generates a request to activate an indicator, the wireless transceiver 404 and/or control logic 402 queues such request until a query is received from the remote control 106.

The user input circuitry 406 may comprise any type of input device, such as one or more buttons, a keypad, a touch panel or touch screen and the like for receiving input from the user 108. In one embodiment, the user input circuitry 406 includes a lost remote recovery button by which a user 108 may request to locate the remote control 106. Responsive to input provided by the user 108, the control logic 402 generates a request to the remote control 106 to activate an audio or visual indicator. The wireless transceiver 404 then transmits such request to the remote control 106 during the next cycle of query/response exchanges between the entertainment device 102A and the remote control 106. For example, the remote control 106 may query the entertainment device 102A according to a pre-determined schedule, such as five seconds between queries.

The control logic 402 may also generate requests to activate the indicator of the remote control 106 based on input from other remote controls. For example, the entertainment device 102A may be associated with multiple remote controls, and a user may desire to locate a misplaced remote control 106. The user 108 may utilize another remote control or buttons of the entertainment device 102A to navigate menus outputted by the control logic 402 to request to locate the lost remote control 106. The control logic 402 responsively generates a request for the remote control 106 to activate the sound emitting device.

In at least one embodiment, the control logic 402 generates a request to activate the indicator of the remote control and specifies parameters for activation of the indicator. For example, the control logic 402 may specify tone, frequency, duration and the like for activation of a sound emitting device of the remote control 106. Such parameters may be determined based on the reason for activating the indicator, user defined preferences and the like. The control logic 402 may also generate a request to deactivate the indicator. For example, the control logic 402 may request the remote control 106 to deactivate a sound emitting device after a specified period of time or based on receipt of additional user input, via the user input circuitry 406 or via another remote control.

As described above, an indicator of a remote control 106 may be activated to indicate alarms, reminders and the like. In at least one embodiment, the control logic 402 may operate timers which indicate specific events, such as alarms or receipt of specific programs. Upon activation of these timers, the wireless transceiver 404 may transmit a request to the remote control to activate the sound emitting device or other indicator of the remote control.

Figure 5:
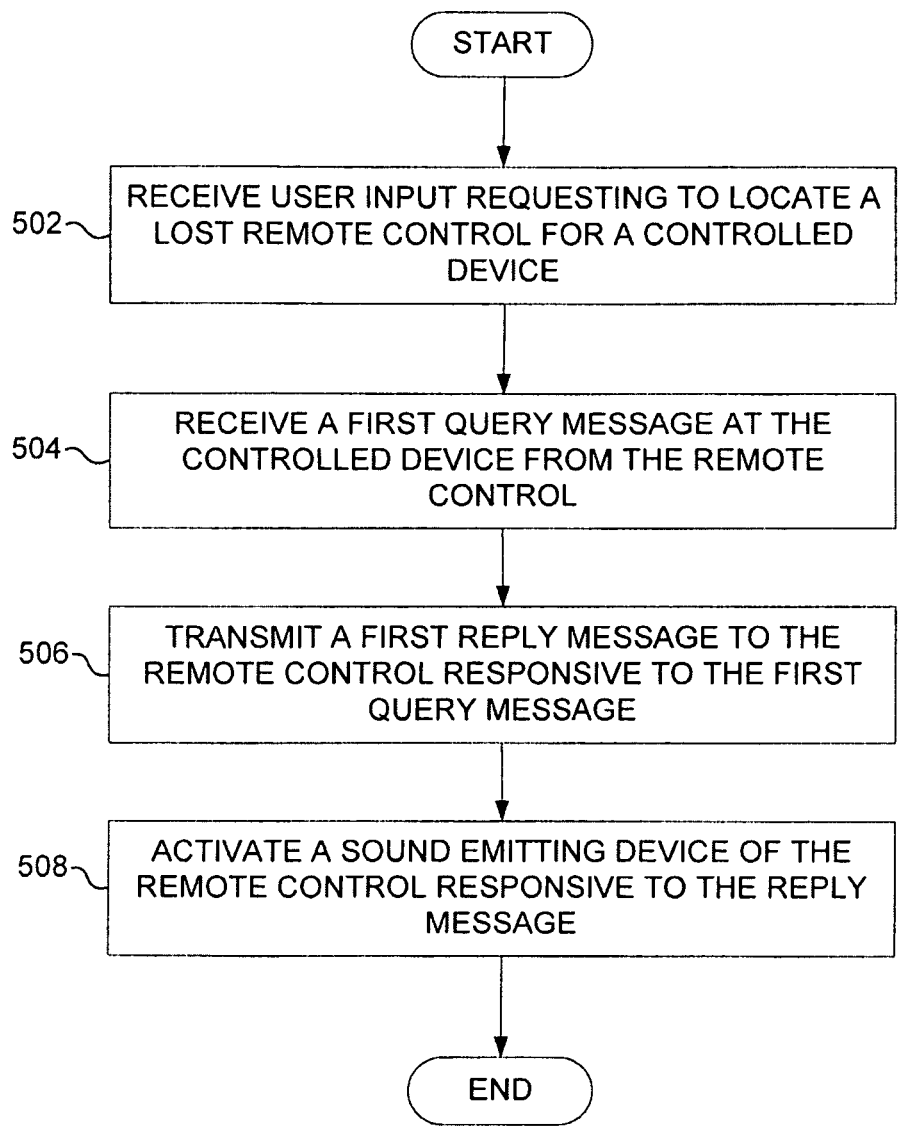
FIG. 5 illustrates an embodiment of a process for locating a lost remote control.

FIG. 5 illustrates an embodiment of a process for locating a lost remote control. It is to be appreciated that the process may be applied to remote controls for any type of controlled device. The process of FIG. 5 is not all inclusive, and may include other operations not illustrated for the sake of brevity.

The process includes receiving user input, at the controlled device, the user input requesting to locate a lost remote control for the controlled device (operation 402). In at least one embodiment, the input may be received via the controlled device directly, e.g., from buttons of the controlled device. The input may also be received by the controlled device indirectly, e.g., via another remote control.

The process further includes receiving a first query message at the controlled device from the remote control (operation 504). The process further includes transmitting a first reply message to the remote control from the controlled device responsive to the first query message (operation 506). The first reply message references the user input requesting to locate the lost remote control. Additionally, the first reply message may include a request to activate the sound emitting device and/or may specify parameters for activating the sound emitting device.

The process further includes activating a sound emitting device of the remote control responsive to the reply message received from the controlled device by the remote control (operation 508). If the remote control includes other indicators, such as visual indicators, then the process may optionally include activating the other indicators. During the period of time when the sound emitting device has been activated, the remote control may perform additional queries of the controlled device. Responsive to one of the additional queries, the controlled device may request the remote control to deactivate the sound emitting device.

In at least one embodiment, the additional queries may be performed based on the original reply, e.g., the remote control transmits a second query a specified time after the remote control receives the original reply. In other words, the query schedule is modified based on the content of the reply. In another embodiment, the remote control transmits a second query according to a predetermined schedule that is independent of the request. In other words, the query schedule may remain the same regardless of the content of the reply.

Although specific embodiments were described herein, the scope of the invention is not limited to those specific embodiments. The scope of the invention is defined by the following claims and any equivalents therein.

I claim:

1. A remote control comprising:
a sound emitting device;
a battery;
a wireless transceiver configured to be powered by the battery;
an output interface; and
control logic comprising at least one processing device communicatively coupled to the wireless transceiver and communicatively coupled to the output interface, the control logic operable to:
from a limited power mode state, automatically turn the wireless transceiver of the remote control on to a full power mode state and to initially place the wireless transceiver of the remote control into a transmit mode to transmit a query message from the remote control to a controlled device, wherein the control logic is operable perform said turning-on of the transceiver, said initial placing into transmit mode, and said transmitting of the query message without any input to said remote control by a user, and wherein the operation of turning-on of the transceiver comprises supplying additional battery power to the transceiver that initially had limited battery power supplied thereto;
subsequent to initially placing the wireless transceiver into the transmit mode, automatically and without input to said remote control by the user switch the transceiver of the remote control from the transmit mode to a receive mode to thereby receive a reply message sent by the controlled device in response to the query message;
identify that the reply message includes a request to activate the sound emitting device of the remote control;
activate the sound emitting device of the remote control responsive to the request;
subsequent to and in response to receiving the reply message, automatically return the wireless transceiver of the remote control to the limited power mode state after the reply message is received to thereby conserve power in the battery, wherein the operation of returning to the limited power mode state of the transceiver comprises removing at least some of the supply of battery power from the transceiver so that the transceiver returns to its initial state of having limited battery power supplied thereto, and said returning is performed without any input to said remote control by the user.

2. The remote control of claim 1, wherein the control logic is operable to activate the sound emitting device for a specified period of time based on a type of the request.

3. The remote control of claim 1 wherein the control logic is configured to turn the wireless transceiver on and to direct the transmission of the query message without input from a user.

4. The remote control of claim 1 wherein the control logic is configured to maintain the remote control in a limited power mode wherein, at regular time intervals, the wireless transceiver is automatically turned on and query messages are transmitted, and wherein the wireless transceiver is automatically turned off between the transmissions of the successive query messages to thereby conserve battery power while the remote control remains in the limited power mode.

5. The remote control of claim 1, wherein the control logic is operable to activate the sound emitting device to emit a specified tone determined based on a type of the request.

6. The remote control of claim 1, wherein the wireless transceiver is further operable to transmit a second query message to the controlled device and receive a second reply message from the controlled device and wherein the control logic deactivates the sound emitting device responsive to the second reply message.

7. The remote control of claim 1, further comprising:
at least one light emitting device;
wherein the control logic is further operable to activate the light emitting device responsive to the request.

8. The remote control of claim 1, further comprising:
user input circuitry communicatively coupled to the control logic, the user input circuitry operable to receive user input;
wherein the control logic is operable to deactivate the sound emitting device responsive to the user input.

9. A method of locating a lost remote control, the method comprising:
receiving user input, at a controlled device, the user input requesting to locate a lost remote control for the controlled device, wherein the user input comprises a user pressing a button of the controlled device;

in response to receiving the user input, generating at the controlled device a command to the remote control to activate a sound emitting device of the remote control;

subsequent to generating the command, receiving a first query message at the controlled device from the remote control, wherein the first query message is automatically generated by the remote control without any input to said remote control by the user, wherein the first query message requests any commands or other information from the controlled device to be transmitted to the remote control;

in response to the controlled device receiving the first query message from the remote control, the controlled device transmitting a first reply message comprising the generated command to the remote control, the first reply message indicating that the user input requesting to locate the lost remote control was received at the controlled device to thereby activate the sound emitting device of the remote control responsive to the reply message transmitted by the controlled device to the remote control.

10. The method of claim 9, further comprising:
receiving a second query message at the controlled device from the remote control;
transmitting a second reply message from the controlled device to the remote control; and
deactivating the sound emitting device of the remote control responsive to the second reply message received from the controlled device by the remote control.

11. The method of claim 9, wherein a duration of time between the transmission of the first query message and the second query message is determined based on a schedule that is independent of the content of the first reply message.

12. The method of claim 9, wherein receiving the user input further comprises:
receiving the user input through a button of the controlled device.

13. The method of claim 9, wherein receiving the user input further comprises:
receiving the user input through a second remote control for the controlled device.

14. The method of claim 9, further comprising:
deactivating the sound emitting device of the remote control after elapse of a specified period of time following activation of the sound emitting device.

15. A method executable by a remote control device powered by a battery to assist a user in locating the remote control device, the method comprising:

automatically activating a wireless transceiver of the remote control, without any input by a user of the remote control, wherein said automatically activating comprises supplying additional battery power to the transceiver that was initially in a limited power mode state;

automatically transmitting a query message from the remote control to a controlled device via the wireless transceiver, wherein said activating of the transceiver and said transmitting of the query message is performed by the remote control device without any input to said remote control device by a user;

receiving a reply message from the controlled device that is responsive to the query message and that includes a request to activate a sound emitting device of the remote control, the reply message comprising a command to activate the sound emitting device that had been generated by the controlled device prior to the remote control automatically transmitting the query message;

activating the sound emitting device of the remote control responsive to the request;

subsequent to and in response to receiving the reply message, automatically deactivating the wireless transceiver of the remote control after the reply message is received to thereby conserve power in the battery, wherein the step of deactivating comprises removing at least some of the supply of battery power from the transceiver so that the transceiver returns to its initial limited power mode state of having limited battery power supplied thereto, said deactivating being performed without any input to said remote control device by the user.

16. The method of claim 15 wherein the request to activate the sound emitting device is generated by the controlled device in response to a user input received at the controlled device indicating a desire to locate the remote control device.

17. The method of claim 16, wherein the user input is provided to the controlled device via a second remote control.

18. The method of claim 15, wherein the controlled device operates a reminder timer regarding a specified event, and wherein the first reply message instructs the second control logic to activate the sound emitting device based on the reminder timer.

19. The method of claim 18, wherein the specified event comprises a reminder for a television program receivable by the controlled device.

20. The method of claim 19, wherein the reminder is associated with one of a plurality of users of the entertainment device, and wherein the first reply message specifies a particular tone to be played by the sound emitting device depending on the particular one of the plurality of users that is associated with the reminder.

* * * * *